United States Patent
Roorda (10) Patent No.: US 6,443,183 B1
(45) Date of Patent: Sep. 3, 2002

(54) VALVE AND ASSEMBLY FOR AXIALLY MOVABLE MEMBERS

(75) Inventor: Oene Roorda, Calgary (CA)

(73) Assignee: Transcend Inc., Calgary (CA)

(*) Notice: Subject to any disclaimer, the term of this patent is extended or adjusted under 35 U.S.C. 154(b) by 0 days.

(21) Appl. No.: 09/588,283

(22) Filed: Jun. 7, 2000

(51) Int. Cl.$^7$ .............................................. F16K 15/18
(52) U.S. Cl. .................. 137/529; 137/543.17; 251/337
(58) Field of Search ............................... 137/540, 529, 137/543.17; 251/337, 129.15

(56) References Cited

U.S. PATENT DOCUMENTS

| | | | |
|---|---|---|---|
| 1,201,827 A | * 10/1916 | Iversen | 137/516.5 |
| 1,244,286 A | * 10/1917 | Breinl | 137/516.5 |
| 1,385,147 A | * 7/1921 | Prellwitz | 137/516.13 |
| 3,598,138 A | * 8/1971 | Hadley | 137/82 |
| 3,692,054 A | * 9/1972 | Buls et al. | 137/596.18 |
| 4,181,208 A | 1/1980 | Davis | 192/106.1 |
| 4,244,388 A | 1/1981 | Feiss | 137/116 |
| 4,635,683 A | * 1/1987 | Nielsen | 137/625.65 |
| 4,694,853 A | 9/1987 | Goodwin | 137/512.1 |
| 4,726,395 A | * 2/1988 | Howes et al. | 137/469 |
| 4,747,426 A | 5/1988 | Weevers | 137/220 |
| 4,778,159 A | 10/1988 | Cooper | 267/161 |
| 4,779,852 A | 10/1988 | Wassell | 267/125 |
| 5,040,372 A | 8/1991 | Higham | 62/6 |
| 5,049,111 A | 9/1991 | Jumel et al. | 464/24 |
| 5,078,648 A | 1/1992 | Stretch | 464/27 |
| 5,078,649 A | 1/1992 | Leichliter et al. | 464/27 |
| 5,219,431 A | 6/1993 | Stretch | 267/261 |
| 5,234,376 A | 8/1993 | Chimner et al. | 464/27 |
| 5,522,214 A | 6/1996 | Beckett et al. | 60/517 |
| 5,577,963 A | 11/1996 | Stretch | 464/77 |
| 5,664,602 A | * 9/1997 | Madrid | 137/515.7 |
| 5,918,628 A | 7/1999 | Harding | 137/512.1 |
| 5,921,276 A | 7/1999 | Lam et al. | 137/514.7 |

OTHER PUBLICATIONS

Abstract and claims of U.S. Patent No. 4,362,475, William R. Seitz, Dec. 7, 1982, 5 pages.
Abstract, claims and figures of U.S. Patent No. 5,226, 514, Thomas D. Chimner et al., Jul. 13, 1993, 7 pages.
Goodwin International product brochure entitled "Valve Types", taken from the internet on Sep. 9, 1999, 2 pages.
Goodwin International product brochure entitled "Check Valves", taken from the internet on Sep. 9, 1999, 1 page.
Axioma International Corp. product brochure entitled "Check Valve", taken from the internet on Sep. 9, 1999, 2 pages, copyright 1998.
CAN/CSA–Z245.15–M91 Steel Valves—Oil and Gas Industry Systems and Materials, A National Standard of Canada, pp. 70, 72, and 59, Mar. 1991.
Specification fro Pipeline Valves (Gate, Plug, Ball, and Check Valves), API Specification 6D (Spec 6D), 21st Edition, Mar. 31, 1994, American Petroleum Institute, pp. 25 and 26.

\* cited by examiner

*Primary Examiner*—Michael Powell Buiz
*Assistant Examiner*—Meredith H. Schoenfeld
(74) *Attorney, Agent, or Firm*—Anthony R. Lambert

(57) ABSTRACT

The fluid flow check valve uses a flexure plate or plates to accommodate the valve disk's axial motion required to open and close the valve. The flexure plate also limits the disk's motion in any lateral direction, so the valve disk will align properly with the valve seat and seal when it closes. The flexure plate is a flat, axial spring, made by cutting or otherwise manufacturing spiral cuts in a round, sheet metal disk. Valve qualities such as closing force, size and rigidity to lateral disk motion can be modified by varying the number and configuration of the plates, and by modifying plate characteristics. The compactness of the flexural plate design allows for a shorter valve length and cost as well as increased opportunity for flow optimization.

21 Claims, 7 Drawing Sheets

VALVE AND ASSEMBLY FOR AXIALLY MOVABLE MEMBERS

FIELD OF THE INVENTION

This invention relates to axially movable members, and in particular to valves and in particular nozzle-style check valves.

BACKGROUND OF THE INVENTION

In a conventional nozzle-style check valve, valve closure is spring assisted. When the flow decelerates the springs pushes a circular disk into the valve seat preventing reverse flow and valve slam. Normal flow pushes the disc backwards and fully opens the valve. In this type of design, flow accelerates in the seat area around the valve seat, enabling valve opening while locally lowering the static pressure. The annular diffuser is subsequently used to gradually recover this pressure with minimum losses.

The circular disk is mounted on a shaft, which in turn is mounted in a bearing or bearings. These bearings are mounted in the shaft guidance. The bearings permit the axial movement of the disk, while limiting lateral disk movement. The disk will therefore align with the valve seat and seal properly when closing. An axial compression spring assists in closing the valve.

Disadvantages with this conventional check valve include bearing friction (which increases due to contamination), reducing the effective spring force and decreasing the valve's dynamic response, the length of the valve body necessary to house the shaft and bearings, and cost of the shaft-bearing-shaft guidance assembly.

SUMMARY OF THE INVENTION

This invention seeks to overcome problems with the prior art.

Therefore, according to a first aspect of the invention, there is provided a valve, comprising a valve body defining a fluid passageway, with a valve seat in the fluid passageway, a valve disk support mounted within the valve body, a front flexure plate mounted on the valve disk support, a valve disk secured to the front flexure plate and disposed within the valve body, the valve disk having a front side and a back side, the valve disk being movable axially within the valve body, the valve being closed when the front side of the valve disk contacts the valve seat, and the front flexure plate being axially extendable to accommodate axial valve disk movement while limiting lateral valve disk movements.

According to a further aspect of the invention, there is provided an assembly for supporting an axially movable member, in which the axially movable member is supported by front and back flexure plates, and the front and back flexure plates are spaced such that each is axially extended when the other is flat.

According to a further aspect of the invention, there is provided an assembly for supporting an axially movable member, the assembly comprising a housing defining a passageway, a support mounted within the housing, a flexure plate mounted on the support, an axially movable member secured to the front flexure plate and disposed within the housing, A compression spring mounted between the support and the axially movable member to bias the axially movable member in one axial direction, and the flexure plate being axially extendable to accommodate axial movement of the axially movable member while limiting lateral movement of the axially movable member.

The flexure plates are preferably flat axial springs fabricated by machining spiral cuts in flat, circular or annular plates. The flexure plates permit the required axial movement of the valve disk, while sufficiently restricting lateral valve disk movement. Their operation is frictionless and they are less expensive to produce than a shaft, bearings and shaft guidance.

In a further aspect of the invention, different numbers of flexure plates can be used in front and back locations by stacking the flexure plates. Adding more flexure plates will increase the lateral stiffness, as would be required for a heavy valve disk. The number of flexure plates will also affect the axial stiffness and thus the rating of the required compression spring. Changing the number and shape of the spiral cuts can vary the flexure plates' properties.

The configuration of the flexure plates can be adjusted by changing the length of the inner spacer rods relative to the outer spacer rods, which fix the axial distance between the front and back flexure plates. Adjusting the configuration can also be a means of sizing the axial stiffness of the flexure plate assembly and compression spring to achieve a wide variety of effective spring stiffnesses as required for varying valve opening and closing conditions, i.e. the valve's dynamic response. The wide available range of closure forces result in a valve with faster dynamic response than in the prior art.

These configurations allow the design of a short, hence more compact, valve body with a lower non-dimensional pressure loss coefficient than prior art, typically 0.85.

In a further aspect of the invention, depending on the particular flow conditions, the flexure plates provide sufficient closure force and an axial compression spring is unnecessary.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

Referring to the figures, the valve 10 comprises a valve body 12 whose interior defines a fluid passageway 14, a valve seat 16 formed on the valve body 12 in the fluid passageway 14, a valve disk 18, a valve disk support housing 20, and compression spring 22. The annular space between the housing 20 and the valve body 12 forms a diffuser area 24. The valve disk support housing 20 forms the inner boundary of the flow diffuser so that fluid pressure loss at the valve seat is partially recovered in accordance with known diffuser principles. Valve disk support housing 20 is known in the art for check valves, and serves to support the valve components within the fluid passageway 14 without unduly hindering fluid flow. Normal fluid flow 26 is in the axial direction 28, and the valve disk 18 moves axially when the valve 10 opens or closes. A lateral direction 30 is any direction perpendicular to the axial direction 28. The valve 10 will have other conventional parts, as is well known to a person in the art. Only features required for an understanding of the invention are shown and described.

The valve disk support housing 20 is mounted to the inner wall of the valve body 14 by struts 32 or other conventional means. The valve 10 is preferably made as two separate parts (i.e. the valve body 12 and the disk support housing 20) to allow easy manufacturing in small sizes, and allow machining of all internal surfaces.

Figure 1:
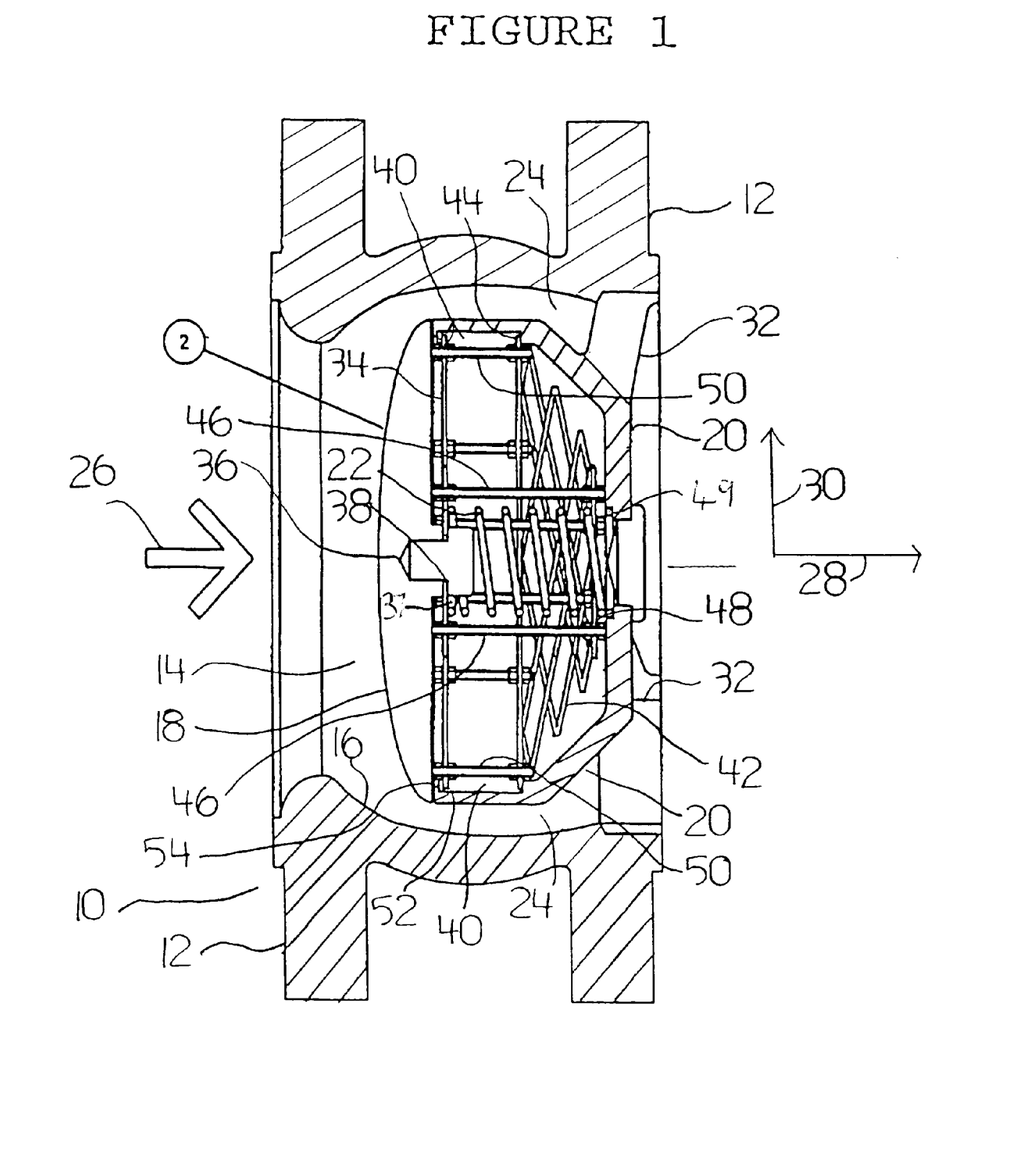
FIG. 1 is a side (lateral) view, partly in section, of a valve incorporating improvements according to the invention, with the valve open.

As illustrated for example in FIG. 1, a front flexure plate 34 (FIG. 2A) is mounted to the back, or down stream side, of the valve disk 18 by means of a valve disk bolt 36. A back flexure plate 42 (FIG. 2B) is mounted at a fixed distance as determined by the length of the outer spacers 50 so it contacts valve disk support housing 20 at the back of an annular groove 40 within the valve disk support housing 20. The pair of flexure plates 34 and 42 may be held within an annular groove 40 through a lockup ring 54.

Figure 1A:
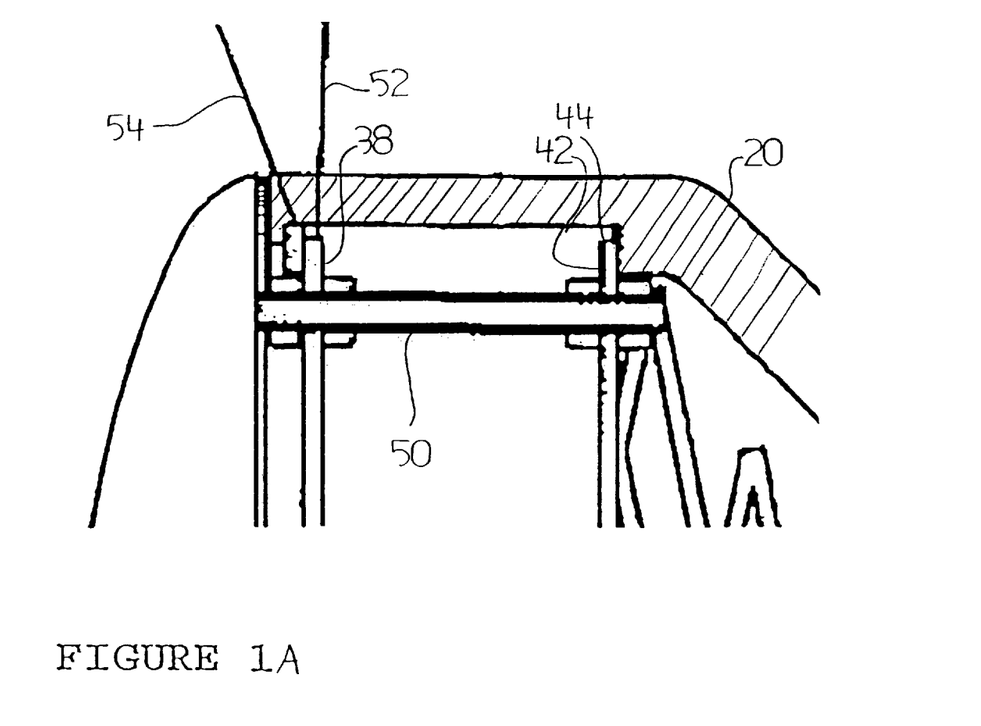
FIG. 1A is a detail, partly in section, showing the mounting of the flexure plates elements 34 and 42 in FIG. 1, in the valve disk support housing, element 20 in FIG. 1.

Inner spacer rods 46 are attached to the flexure plates 34, 42, as for example with nuts as shown, near the inner diameters 38, 48 and maintain a fixed axial distance between the flexure plates' inner diameters 38, 48. Similarly, outer spacer rods 50 are attached to the flexure plates 34, 42 as for example with a pair of nuts, near their outer diameters 44, 52 and maintain a fixed axial distance between the outer diameters 44, 52. Referring to FIG. 1A, a lockup ring 54 holds the flexure plates 34, 42 in place in the groove 40 in the valve disk support housing 20. Alternatively, the front and back flexure plates 34, 42 can be mounted in the valve disk support housing 20 by attaching one or both to the valve disk support housing 20 at the flexure plate outer diameter or diameters 44, 52. No outer spacer rods 50 are needed if both flexure plates 34,42 are so attached to the valve disk support housing 20.

Figure 2A:
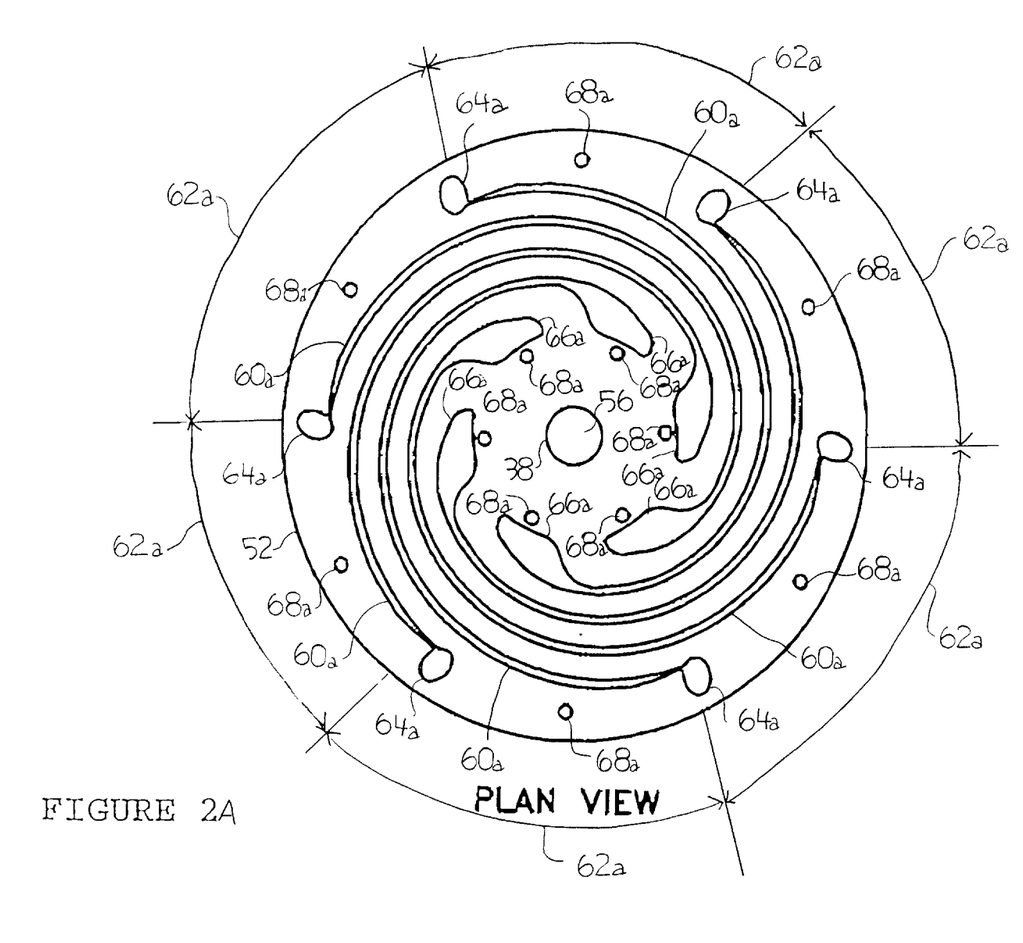
FIGS. 2A and 2B are respectively axial views showing detail of the front and back flexure plates, elements 34 and 42 in FIG. 1.
Figure 2B:
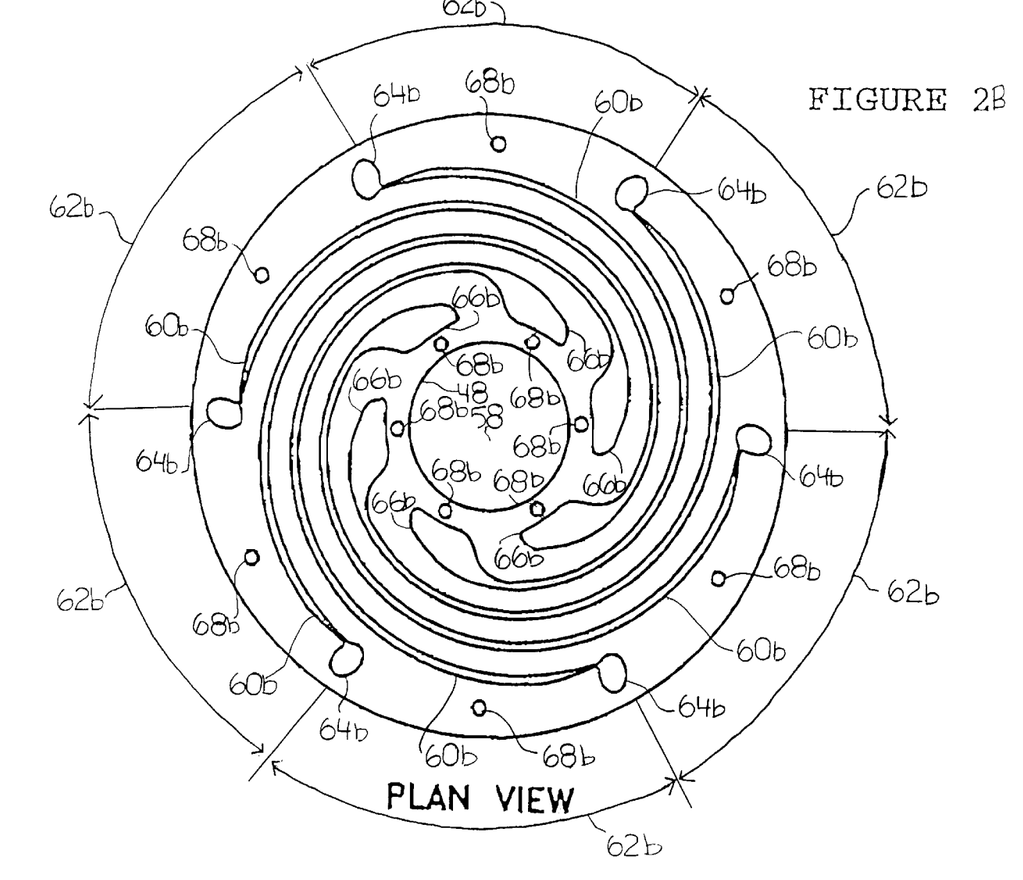

Both front and back flexure plates 34, 42 are mounted co-axially with the valve disk 18 and compression spring 22. Their axis is parallel to the flow direction 26 and axial direction 28. The flexure plates' flat faces, shown in detail in FIG. 2, are therefore perpendicular to the flow direction 26. The compression spring 22 is located (or mounted) in the hollow center of the flexure plate 42 and abuts against the inner portion of the flexure plate 34. The compression spring 22 is centered by a circular recess 49 in the valve disk support 20 and by a circular hub 37 in the backside of the front flexure disc 18.

The flexure plates 34, 42 allow the axial motion of the valve disk 18 necessary to open and close the valve 10. The flexure plates 34, 42 also minimize lateral 30 movement of the valve disk 18 so the valve disk 18 will align properly with the valve seat 16 when the valve 10 closes.

The flexure plates 34, 42 are preferably flat plates cut from sheet metal, as shown in FIGS. 2A and 2B. FIGS. 2A and 2B show the front plate 34 as having a hollow center 56 to accommodate the valve disk bolt 36 and the back plate 42 also having a hollow center 58 to accommodate passage of the compression spring. The back plate 42 can have a solid center 58 if no passage for the compression spring 22 or other components is required. The front flexure plate 34 may be attached to the disk 18 by a valve disk bolt 36 or by other suitable means.

Referring to FIGS. 2A and 2B, the flexure plate 34, 42 is a flat spring made by machining cuts 60a, 60b through the flat plate. Each cut 60a, 60b is along a spiral or spiral-like path from near the flexure plate outer diameter 44, 52 to near the flexure plate inner diameter 38, 48. The shape of the spiral path is the same (in the figure shown they are the same, this is not necessarily always the case) for each cut 60a, 60b. The spiral cuts are spaced evenly around the plate (in the figure shown they are the same, this is not necessarily always the case), so the radial angles between the cuts 62a, 62b of coinciding cuts are equal. The flexure plates 34, 42 can have fewer or more than the 6 cuts 60a, 60b shown. The spiral path shape can be different than that shown, although the path shape should be the same for all coinciding cuts in front and back flexure plate. At each end of a cut 60a, 60b, a hole 64a, 66a, 64b, 66b can be cut to relieve local stresses and facilitate machining the cut 60a, 60b. Holes 68a, 68b, near the inner and outer diameters 38, 48, 44, 52 of the flexure plates 34, 42 may be used for so attaching the flexure plates 34, 42 inner and outer spacer rods 46, 50.

FIG. 1 shows the valve 10 in the open position. The front flexure plate 34 is flat, while the back flexure plate 42 is axially extended by the differential pressure force across the valve disk overcoming the compression spring 22 and any spring force in the flexure plates. The inner spacers 46, being longer relative to the outer spacers 50, force the back flexure plate 42 into extension. When fluid flow is normal, the flow creates a differential pressure force across the valve disk 18, which is sufficient to compress the compression spring 22 and extend the back flexure plate 42, maintaining the valve 10 open.

Figure 3:
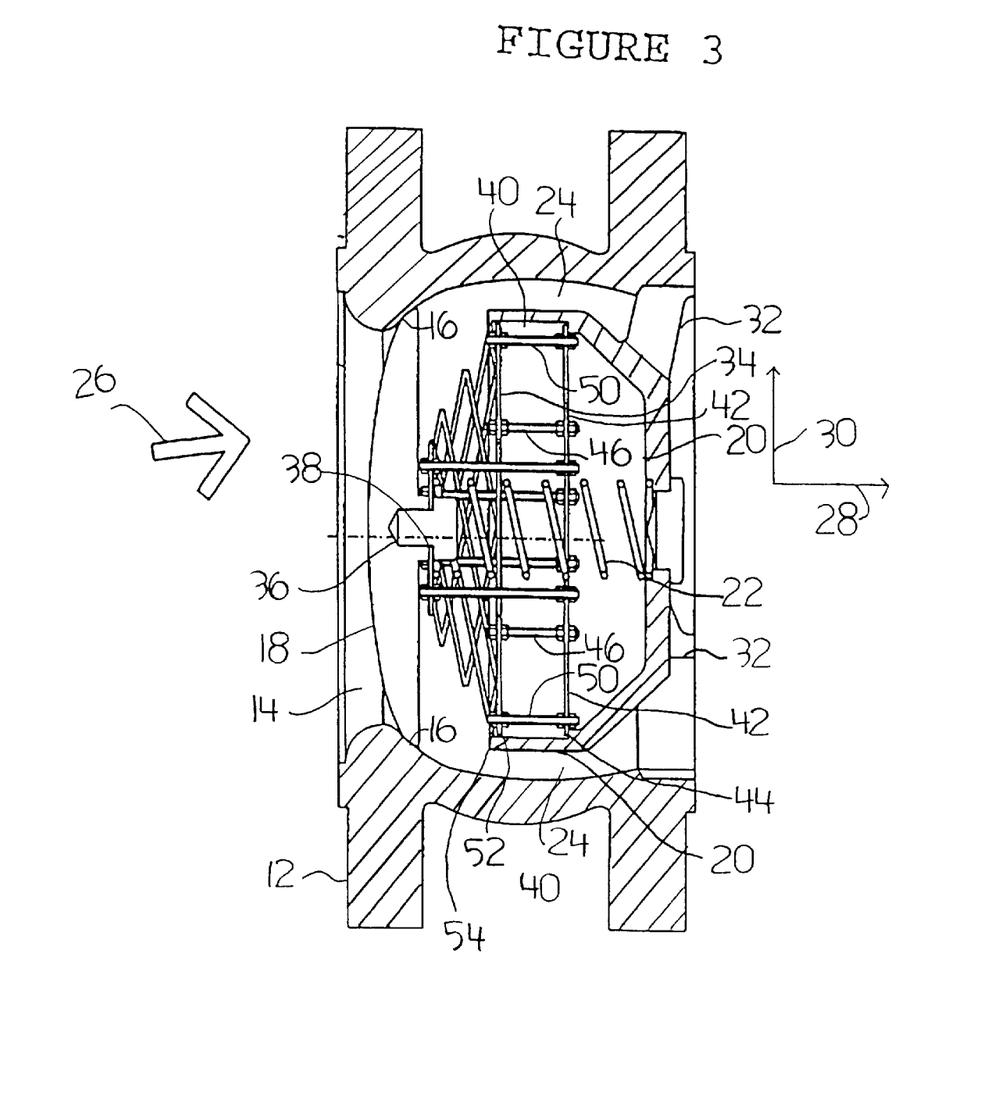
FIG. 3 is the view shown in FIG. 1, with the valve closed.

When the fluid flow decelerates and becomes too low or reverses, it does not produce sufficient differential pressure force across the valve disk 18 to maintain the valve 10 open. The valve disk 18 therefore moves axially 28 towards the closed position and seals against the valve seat 16, as shown in FIG. 3. In this closed position, the back flexure plate 42 is now flat, and the front flexure plate 34 is axially extended.

The configuration of the flexure plates 34, 42 can be varied by varying the lengths of the spacer rods 46 relative to 50 thereby varying the flexure plate assembly length, closure force and tilting stiffness. Tilting means rotation of the valve disk about a lateral 30 axis. In the embodiment shown in FIGS. 1 and 3, the inner spacer rods 46 are twice the length of the outer spacer rods. The outer spacer rods' 50 length is the same as the distance the valve disk 18 travels as it moves from fully open to closed.

Figure 4:
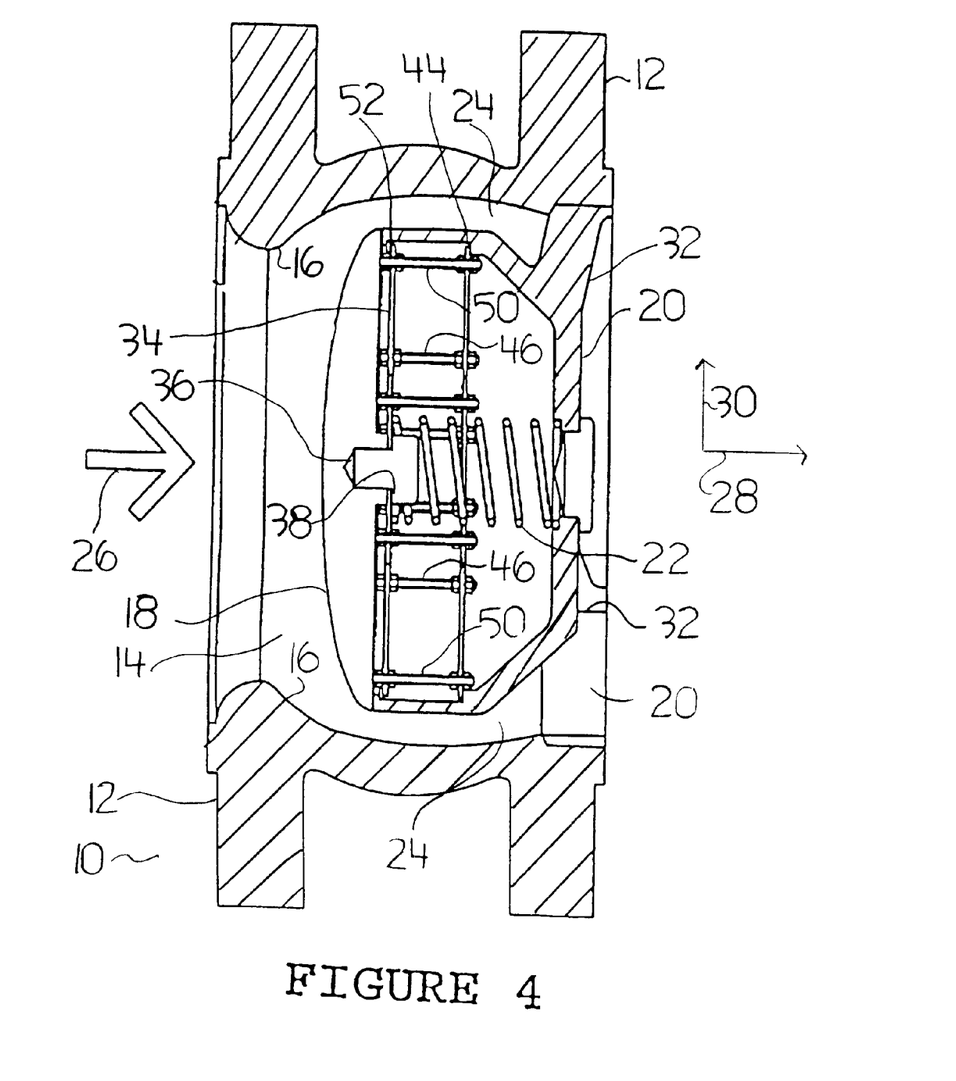
FIG. 4 is a side (lateral) view, partly in section, of a valve incorporating improvements according to the invention, alternative embodiment, with the valve open.
Figure 5:
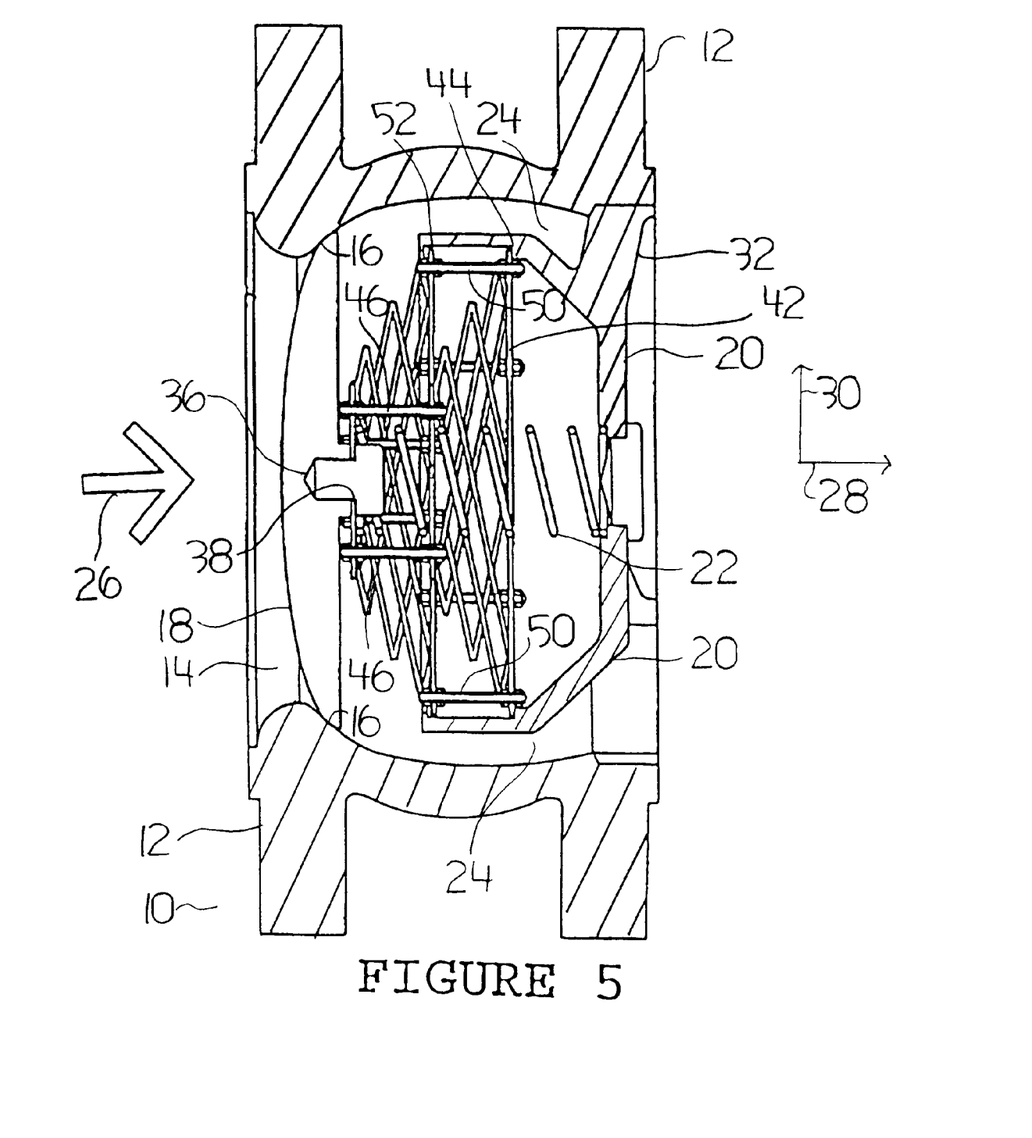
FIG. 5 is the view shown in FIG. 4, with the valve closed.

A further preferred embodiment is shown in FIGS. 4 and 5, which show the valve 10 open and closed respectively. The length of the inner and outer spacer rods 46, 50 and the valve travel distance are all equal. The front and back flexure plates 34, 42 are always identically axially displaced. This embodiment provides for the shortest flexure plate assembly, hence this configuration allows for the design of the most compact valve, at the expense of reduced resistance to prevent tilting of the valve disk and increased axial stiffness of the flexure plate assembly.

A wide range of valve closure forces is available as there are several valve components that can be adjusted. The valve closure forces depend upon the stiffness of the flexure plates 34, 42, the stiffness of the axial spring 22, if any, the configuration of the flexure plates 34, 42 and the valve 10 closing travel distance. The opening and closure forces, for the two embodiments can be calculated as follows:

FIG. 1: Fopen=Fcsc−½Fplate (thus providing, a low opening force while at the same time providing high resistance against tilting of the disc, which are the two main advantages of this configuration)

FIG. 3: Fclose=Fcse−½Fplate,

FIG. 4: Fopen=Fcsc

FIG. 5: Fclose=Fcse−2Fplate

Where

Fopen=total spring force (flexure plates and compression spring) when valve fully open Fclose=total spring force when valve fully closed Fcsc=fully compressed compression spring force when the valve is opened Fcse=extended compression spring force when the valve is closed Fcsc>Fcse Fplate=force to fully extend one flexure plate or a stack of flexure plates (front or back) for an assembly where front and back plates are identical (the same plate thickness, and number and shape of the spiral cuts).

Therefore, in these two embodiments, the spring forces are greater for the valve fully open than for fully closed. The force from a flexure plate or compression spring is proportional to distance it is extended or compressed. Therefore increasing the length of the inner spacer rods 46 relative to the length of the outer spacer rods 50 will increase the effective closing force exerted by the compression spring 22. Conversely, decreasing the length of the inner spacer rods 46 relative to the length of the outer spacer rods 50 will decrease the effective closing force exerted by the compression spring 22.

In the case of use of front and back guide plates, both guide plates provide lateral support for the valve disk. The inside-diameter spacers distribute the tilting momentum of the disk over the front and back guide plates. Minimum tilting resistance is provided when inner and outer spacer rods have the same length. The longer the relative difference between inner and outer spacer rods, the larger the tilting resistance provided by the guide plates. Maximum tilting resistance is achieved when the back flexure plates are flat when the valve is in closed position. This can be achieved at minimum assembly length when the inner spacer rod length (IDL) is twice as long as the outer spacer rod length (ODL) and when the outside diameter spacer length (ODL) is equal to the valve stroke(s).

The axial stiffness of the flexure guide plate assembly can be modified by making the length (IDL) of the inner spacers longer than the length (ODL) of the outer spacers. The maximum length of the inner spacers is IDL=2×ODL. In this way, two different guide plates can be assembled with minimum (FIGS. 1 and 3) and maximum (FIGS. 4 and 5) lateral stiffness. In FIG. 1, IDL=2×s=2×ODL, so that the total valve stroke requires ¼ of the load required for the embodiment shown in FIG. 4. In FIG. 4, IDL=1×s=ODL, thus is more compact.

A further, preferred embodiment is to stack more than one flexure plate in one or both of the front and back locations 34, 42. These stacked plates provide greater lateral stiffness, as would be required for a heavy valve disk.

In a further preferred embodiment, there is only one flexure plate or stack of flexure plates. If the front flexure plate 34 or plates in the embodiments described above provide or provides for sufficient lateral stiffness and spring forces, no back flexure plate 42 is necessary. In a further possible embodiment, the valve disk support may be located upstream of the valve seat, with the valve disk on the downstream side. In this configuration, the slight axial tension caused by extension of the flexure plate may be used to provide the forces that bias the valve disk against the valve seat.

The valve described here may also be operated as a control valve in which the valve opening and closing is controlled externally, and not dependent on fluid flow changes.

While the flexure plates 34, 42 are shown attached by their outer peripheries to the support housing 20, they could also be attached to the support housing 20 by their inner portions, for example by a shaft extending from the support housing 20, and the outer periphery of the flexure plate 34 then connected to the outer periphery of the disk 18.

Further, the use of two flexure plates, one being extended when the other is not, and the use of one flexure plate in combination with a compression spring, also has novel application to applications that do not include valves. These embodiments are generally applicable to any axially movable member, where axial extension with limited lateral movement is desirable.

In the embodiment shown in FIGS. 4 and 5, a wave spring may advantageously be used for the compression spring.

A person skilled in the art could make immaterial changes to the exemplary embodiments described here without departing from the essence of the invention that is intended to be covered by the scope of the claims that follow.

I claim:

1. A valve, comprising:

a valve body defining a fluid passageway, with a valve seat in the fluid passageway;

a valve disk support assembly mounted within the valve body;

a front flexure plate mounted on the valve disk support assembly;

a valve disk secured to the front flexure plate and disposed within the valve body, the valve disk having a front side and a back side, the valve disk being movable axially within the valve body, the valve being closed when the front side of the valve disk contacts the valve seat; and the front flexure plate having a center and a periphery and being axially extendable to accommodate axial valve disk movement by a plurality of arms connecting between the center and the periphery of the front flexure plate.

2. The valve of claim 1 in which the valve disk is biased against the valve seat in the absence of flow in the fluid passageway.

3. The valve of claim 1 further comprising a back flexure plate mounted on the valve disk support assembly parallel to the front flexure plate, and spaced by spacers from the front flexure plate, the back flexure plate being axially extendable and cooperating with the front flexure plate to accommodate axial valve disk movement while limiting lateral valve disk movement.

4. The valve of claim 1 in which the front flexure plate comprises a flat disk with spiral cuts arranged symmetrically to allow axial valve disc movement.

5. The valve of claim 3 in which each of the front and back flexure plates comprises a flat disk with spiral cuts.

6. The valve of claim 3 in which the back flexure plate has a solid center.

7. The valve of claim 3 in which the front and back flexure plates are spaced such that each is axially extended when the other is flat.

8. The valve of claim 3 in which the front and back flexure plates are spaced by outer spacer rods attached near the periphery of the front and back flexure plates.

9. The valve of claim 8 in which the front and back flexure plates are spaced by inner spacer rods attached near inner diameters of the flexure plates.

10. The valve of claim 9 in which the inner spacers have a length IDL, the outer spacers have a length ODL, the valve disk has a stroke s, and IDL=2s=2ODL.

11. The valve of claim 9 in which the inner spacers have a length IDL, the outer spacers have a length ODL, the valve disk has a stroke s, and IDL=s=ODL.

12. The valve of claim 3 in which each of the front and back flexure plates are attached at their respective peripheries to the valve disk support housing.

13. The valve of claim 1 further comprising a compression spring mounted co-axially with the front flexure plate between the valve disk support housing and front flexure plate, the compression spring acting to bias the valve disk against the valve seat.

14. The valve of claim 3 further comprising a compression spring mounted co-axially with the front and back flexure plates between the valve disk support and front flexure plate, and the compression spring passing through the back flexure plate, the compression spring acting to bias the valve disk against the valve seat.

15. The valve of claim 1 further comprising plural flexure plates stacked together with the front flexure plate, each of the plural flexure plates being axially extendable to accommodate axial valve disk movement while limiting lateral valve disk movement.

16. An assembly for supporting an axially movable member, the assembly comprising:
   a housing defining a passageway;
   a support assembly mounted within the housing;
   a front flexure plate mounted on the support assembly;
   a back flexure plate mounted on the support parallel to and spaced from the front flexure plate by spacer members;
   an axially movable member secured to the front flexure plate and disposed within the disk support housing;
   each of the front flexure plate and back flexure plate being axially extendable to accommodate axial movement of the axially movable member while limiting lateral movement of the axially movable member; and
   the front and back flexure plates being spaced such that each is axially extended when the other is flat.

17. The assembly of claim 16 in which each of the front and back flexure plates comprises a flat disk with spiral cuts.

18. The assembly of claim 16 further in combination with a compression spring mounted between the support and the axially movable member to bias the axially movable member in one axial direction.

19. An assembly for supporting an axially movable member, the assembly comprising:
   a housing defining a passageway;
   a support mounted within the housing;
   a flexure plate mounted on the support;
   an axially movable member secured to the front flexure plate and disposed within the housing;
   a compression spring mounted between the support and the axially movable member to bias the axially movable member in one axial direction; and
   the flexure plate having a center and a periphery and being axially extendable to accommodate axial movement of the axially movable member by a plurality of arms connecting between the center and the periphery of the front flexure plate.

20. The assembly of claim 19 in which the flexure plate is a flat disk with spiral grooves arranged symmetrically to allow axial valve disc movement.

21. A valve, comprising:
   a valve body defining a fluid passageway, with a valve seat in the fluid passageway;
   a valve disk support assembly mounted within the valve body;
   a front flexure plate mounted on the valve disk support assembly;
   a valve disk secured to the front flexure plate and disposed within the valve body, the valve disk having a front side and a back side, the valve disk being movable axially within the valve body, the valve being closed when the front side of the valve disk contacts the valve seat; and
   the front flexure plate having a center and a periphery and being axially extendable to accommodate axial valve disk movement by at least one arm connecting between the center W)d the periphery of the front flexure plate, the at least one arm forming a unidirectional spiral.

* * * * *